2,923,691

PROCESS OF REACTING PROTEIN WITH ISOCYANIC ACID AND THEN WITH ALDEHYDE AND POLYMERIZED PRODUCT PREPARED THEREFROM

Harland H. Young, Western Springs, and Edward F. Christopher, Chicago, Ill., assignors to Swift & Company, Chicago, Ill., a corporation of Illinois No Drawing. Application September 9, 1955
Serial No. 533,521

12 Claims. (Cl. 260—6)

This invention relates in general to the polymerization of certain proteins. More particularly, the invention is directed to the addition of aldehydes to modified proteins thereby yielding new and useful polymers.

For purposes of promoting polymerization, tanning, or insolubility, it is common to react proteins with certain inorganic salts, such as alum, chrome, or iron. Other agents employed in the tanning of proteins are the aldehydes, oxidized oils, sugars and certain phenolic tannins, e.g. the phenolic sulfonic acids.

These tanning reactions find commercial utility primarily in the treatment of animal glue. For example, the addition of small quantities of formaldehyde, aluminum, or chromium salts to animal glue increases the molecular weight or micelle size and concomitantly raises the viscosity. These reactions must be carefully controlled as too great a degree of polymerization will cause insolubility of the finished product. The quantity of formaldehyde or heavy metal salt must therefore be kept at levels no greater than one to two tenths percent based on the weight of the glue treated—provided that the glue is low test, or highly degraded. In the case of high test glues, a mere two or three hundredths of a percent is a maximum.

Hydroxy-aldehydes also find their way into flexible or non-warp glue in the form of plasticizers and extenders. The aldehyde sugar, glucose, is frequently used, as is invert sugar, which is a mixture of glucose and fructose. However, unless the tannage reaction spoken of earlier is somehow prevented, for example by inactivating the aldehyde through the addition of sulfites or bisulfites, the glues become insoluble after long storage.

It is therefore an object of this invention to provide a process whereby the insolubilization or tanning which results from condensing aldehydes and proteins together may be controlled.

A further object of this invention is to provide a method whereby animal glue may be treated with a tanning agent so as to modify the viscosity and jelly characteristics of the glue without encountering objectionable solidification and insolubilization.

Still another object is to provide a method which not only properly increases the viscosity of animal glue but concomitantly therewith increases the jelly strength of the product—particularly the lower test or last run glues which are most in need of upgrading.

Other objects and advantages if not specifically set out, will become apparent during the course of the detailed description which follows.

Generally, the present invention comprises modifying proteins with isocyanic acid so as to convert them into substituted ureas of great molecular weight and thereafter condensing the modified proteins with aldehydes or simply adding the aldehydes thereto.

More particularly, the present invention may involve modifying the proteinaceous matter to be employed in the fashion set forth in applicants' copending application entitled "Urea Derivatives From Poteins," filed September 9, 1955, Serial No. 533,522, which issued as Patent No. 2,816,099 on December 10, 1957. Suitable cyanic acid salts or derivatives which, if treated with a mildly acid solution liberate nascent isocyanic acid, may be caused to react with a protein material so as to yield a water soluble or hydrophylic proteinyl urea. Any other method of producing a proteinyl urea may also be employed. The well known reaction of isocyanic esters with amino compounds to form urethanes or their polymers is not included, however, since these substances are insoluble in water and do not lend themselves to the instant process. As is described below, proteinyl ureas react with aldehydes such as formaldehyde, glucose, or furfuraldehyde so as to form the products of the present invention. The aldehyde may simply be admixed directly with the newly formed proteinyl urea before the latter is entirely formed or may be added at any convenient time subsequent to its formation.

As is indicated in applicants' above identified copending application, proteinyl ureas possess the general formula:

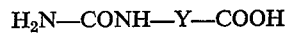

wherein Y designates a protein grouping and

is a free carbamido radical.

As the pH prevailing at the time of the aldehyde-proteinyl urea condensation determines the solubility of the product, it is important that this factor be carefully controlled. If the final product has a pH of 5½ or more, it will be readily soluble in water. At about 5, it becomes difficult to dissolve and at about 4 becomes insoluble in water after drying.

The temperature at which the aldehyde contacts the proteinyl urea is not particularly critical except insofar as it should be sufficiently high to maintain the protein in a liquid state. In the case of glue liquors having a high gelation point, a moderate amount of warming may be necessary—perhaps to about 130° F. An excessively high temperature is objectionable only in that if the proteinyl urea is being formed by contact of a protein with nascent isocyanic acid in a mildly acidic solution in the presence of the aldehyde whereby to immediately form the final proteinyl urea-aldehyde polymer, excessively high temperature levels may result in hydrolysis of the isocyanic acid before it has had adequate opportunity to react with the protein.

The properties of these proteinyl urea-aldehyde polymers particularly suit them for use as glues. As has already been pointed out, the viscosity of animal glue is increased by condensing an aldehyde with the protein material. Also, aldehyde sugars such as glucose are employed in animal glues as plasticizers. By employing the principles of this invention, insolubility in the finished product resulting from uncontrollable tannage can be eliminated. Instead of becoming insoluble after addition of .03 to .08 percent formalin (in the form of the commercially available 37% solution) bone glues which have been first converted to substituted ureas or proteinyl ureas by treatment with isocyanic acid can tolerate 1 or even 1.2% formalin before insolubility is encountered. The glue so treated may still turn somewhat brown or caramelize, but more important, insolubility is avoided. Furthermore, condensation of proteinyl ureas not only increases the glue viscosity in the usual fashion but also significantly increases the jelly strength of the product; and this jelly strength increase is at its maximum when low test or "last run" bone glues are modified. For example, a bone glue having a jelly strength of 33 g. and a viscosity of 33 millipoises may be upgraded by this process to a jelly strength of 57 g. and a viscosity of 83 millipoises. However, if a higher testing bone glue having initially a jelly strength of 166 g. and a viscosity of 59 millipoises is selected, modification produces a jelly strength of 179 g. and a viscosity of 100 millipoises. It is seen, therefore, that the present invention provides a method whereby the last run bone glues, those most in need of upgrading, may be most significantly improved. Examples are set out below as illustrations of the method of the present invention but are not to be construed as placing any limitation thereon other than as is set forth in the appended claims.

EXAMPLE I

Bone glue liquors were cooled to a temperature just above the gelation point. The pH was adjusted to about 6.2. Two percent potassium cyanate (based on the weight of the dry glue solids) was added with stirring. After passage of about 20 minutes, the released isocyanic acid was entirely reacted. The resulting product was a proteinyl urea having a somewhat lowered isoelectric point but unchanged physically from the original protein. At this point .625% formalin (based upon the weight of glue solids) was slowly added in a dilute solution (three-fourths water). On completion of the formalin addition, agitation was continued for about 30 minutes. The temperature was then raised to 160° F. for ten minutes to complete the proteinyl urea-formaldehyde reaction. Concentration and drying by conventional methods followed.

The results of further application of this invention to bone glue employing varying acidity levels and varying amounts of formalin are set out below in tabular form where:

pH refers to the acidity at time of addition of cyanate;
$pH_f$ refers to the acidity after addition of formalin;
Jelly refers to jelly strength in grams (Bloom);
Visc. refers to viscosity in millipoises;
Percent KCNO refers to KCNO based on glue solids weight;
Percent formalin refers to formalin based on glue solids weight;
Percent increase jelly refers to percent increase in jelly strength;
Percent increase visc. refers to percent increase in viscosity.

| pH | Jelly | Visc. | Percent KCNO | Percent Formalin | $pH_f$ | Percent Increase Jelly | Percent Increase Visc. |
|---|---|---|---|---|---|---|---|
| 6.0 | 28 | 27 | Control | | 5.9 | | |
| 6.0 | 35 | 47 | 2.00 | .900 | 6.35 | 25 | 74 |
| 5.9 | 37 | 46 | 2.00 | .900 | 6.40 | 32.1 | 70.3 |
| 6.3 | 33 | 33 | Control | | 6.20 | | |
| 6.0 | 56 | 74 | 2.00 | .625 | 6.50 | 40 | 124 |
| 6.5 | 51 | 57 | 2.00 | .625 | 6.90 | 54.5 | 72.7 |
| 7.0 | 48 | 50 | 2.00 | .625 | 7.00 | 45.5 | 51.5 |
| 6.2 | 37 | 34 | Control | | 6.35 | | |
| 6.2 | 51 | 43 | 2.00 | .575 | 6.80 | 37.8 | 26.5 |
| 6.2 | 51 | 42 | 2.00 | .550 | 6.85 | 37.8 | 23.5 |
| 6.0 | 45 | 35 | Control | | 6.20 | | |
| 5.5 | 63 | 58 | 2.00 | .625 | 5.50 | 40 | 65.7 |
| 6.1 | 84 | 44 | Control | | 6.25 | | |
| 8.0 | 97 | 103 | 2.00 | .625 | 5.50 | 15.5 | 134 |
| 6.1 | 89 | 46 | Control | | 6.25 | | |
| 6.1 | 103 | 193 | 2.00 | .625 | 6.65 | 15.7 | 319 |
| 6.1 | 100 | 208 | 2.00 | .625 | 7.00 | 12.3 | |
| 6.1 | 166 | 59 | Control | | 6.10 | | |
| 6.1 | 182 | 114 | 2.00 | .3?0 | 6.60 | 9.6 | 93.2 |
| 6.1 | 179 | 86 | 2.00 | .300 | 6.80 | 7.83 | 49.4 |
| 6.3 | 33 | 33 | Control | | 6.2 | | |
| 4.5 | Insoluble | | 1.25 | 0.625 | 4.85 | Insoluble | |
| 4.5 | Insoluble | | 1.25 | 0.625 | 5.05 | Insoluble | |

EXAMPLE II

Tests were conducted for purposes of showing the increased tolerance which is exhibited by various standard flexible glues to plasticizers such as glucose when this invention is applied.

An aqueous dispersion of 14.65% Maflex glucose based on the total formula weight was incorporated together with 17.82% dry bone glue solids—700 grams in this particular batch. The product was divided into two equal portions and one of these treated with 2% potassium cyanate, based on the bone glue weight, in the fashion described in Example I. Both portions of glue were then heated to 150–156° F. for 72 hours. At the end of this time, the glue which had been treated with the potassium cyanate was still fluid and only very slightly discolored. By way of contrast, that portion of the batch which had not been so treated was dark brown, viscous and almost insoluble.

As is clear from the above, application of this invention provides a method of controlling the degree of polymerization and hence insolubility to be exhibited by the final protein product. Far greater quantities of a tanning agent than have heretofore been possible may be admixed with the protein without inducing objectionable insolubility. Not only is it therefore possible to add greater quantities of aldehyde sugar as a plasticizing agent to glues, but additionally, the danger that a minute excess of the aldehyde may produce an insoluble and useless glue product is materially lessened. Finally, the invention affords a method for improving not only viscosity but also jelly strength, and, as indicated in Table I, such jelly strength improvement is most significant in the case of the low test glues—those most in need of upgrading.

While the foregoing has dealt principally with animal glue as the protein material, other similar proteins may also be modified whereby to effect a greater tolerance for aldehydes than would ordinarily be possible. For example, blood, casein, soybean, cottonseed, or peanut proteins may be condensed with aldehydes and may be modified by treatment with isocyanic acid and thereafter treated with an aldehyde according to the method set out. Also, as tanning agents, formaldehyde and furfuraldehyde have been discussed exclusively. Others, such as acetaldehyde and glyoxal also serve but are not preferred since they produce a glue product of objectionable color due primarily to tar formation. As would be expected, substances which yield the desired aldehydes under the particular reaction conditions set out may be employed, in some cases. For example, hexamethylenetetramine, paraformaldehyde, trioxymethylene, and metaldehyde may be substituted for formaldehyde as tanning agents.

Obviously many modifications and variations of the invention as hereinbefore set forth may be made without departing from the spirit and scope thereof and therefore only such limitations should be imposed as are indicated in the appended claims.

We claim:

1. A proteinyl urea-aldehyde copolymer prepared by reacting from about .1% to about 1.2% of an aldehyde, based on the weight of the protein solids, with a proteinyl urea at a pH of at least about 5, said proteinyl urea being formed by treating a protein with isocyanic acid whereby the free amino groups of said protein are converted to free carbamido groups.

2. A proteinyl urea-formaldehyde copolymer prepared by reacting from about .1% to about 1.2% of formaldehyde, based on the weight of the protein solids, with a proteinyl urea at a pH of at least about 5, said proteinyl urea being formed by treating a protein with isocyanic acid whereby the free amino groups of said protein are converted to free carbamido groups.

3. A proteinyl urea-aldehyde copolymer prepared by reacting from about .1% to about 1.2% of an aldehyde, based on the weight of the protein solids, with a proteinyl urea at a pH of at least about 5, said proteinyl urea being formed by treating bone glue with isocyanic acid whereby the free amino groups of said bone glue are converted to free carbamido groups.

4. A proteinyl urea-formaldehyde copolymer prepared by reacting from about .1% to about 1.2% of formaldehyde, based on the weight of the protein solids, with a proteinyl urea at a pH of at least about 5, said proteinyl urea being formed by treating bone glue with isocyanic acid whereby the free amino groups of said bone blue are converted to free carbamido groups.

5. A proteinyl urea-aldehyde sugar copolymer prepared by reacting from about .1% to about 1.2%, based on the weight of the protein solids, of an aldehyde sugar selected from the group consisting of glucose and a mixture of glucose and fructose with a proteinyl urea at a pH of at least about 5, said proteinyl urea being formed by treating a protein with isocyanic acid whereby the free amino groups of said protein are converted to free carbamido groups.

6. A proteinyl urea-aldehyde sugar copolymer prepared by reacting from about .1% to about 1.2%, based on the weight of the protein solids, of an aldehyde sugar selected from the group consisting of glucose and a mixture of glucose and fructose with a proteinyl urea at a pH of at least about 5, said proteinyl urea being formed by treating bone glue with isocyanic acid whereby the free amino groups of said bone glue are converted to free carbamido groups.

7. A method of preparing polymerized protein materials which comprises: contacting a protein with isocyanic acid whereby the free amino groups of the protein are converted to free carbamido groups; and thereafter reacting the resultant proteinyl urea in a liquid state with from about .1% to about 1.2% of an aldehyde, based on the weight of the protein solids, at a pH of at least about 5.

8. A method of preparing polymerized protein materials which comprises: contacting a protein with isocyanic acid whereby the free amino groups of the protein are converted to free carbamido groups; and thereafter reacting the resultant proteinyl urea in a liquid state with from about .1% to about 1.2% of formaldehyde, based on the weight of the protein solids, at a pH of at least about 5.

9. A method of preparing polymerized protein materials which comprises: contacting a protein with isocyanic acid whereby the free amino groups of the protein are converted to free carbamido groups; and thereafter reacting the resultant proteinyl urea in a liquid state with from about .1% to about 1.2% of an aldehyde sugar selected from the group consisting of glucose and a mixture of glucose and fructose, based on the weight of the protein solids, at a pH of at least about 5.

10. A method of increasing the viscosity and jelly strength of animal glue which comprises: contacting animal protein liquor with isocyanic acid whereby the free amino groups of the protein are converted to free carbamido groups; and thereafter reacting the resultant proteinyl urea in the liquid state with from about .1% to about 1.2% of an aldehyde, based on the weight of the protein solids, at a pH of at least about 5.

11. A method of increasing the viscosity and jelly strength of animal glue which comprises: contacting animal protein liquor with isocyanic acid whereby the free amino groups of the protein are converted to free carbamido groups; and thereafter reacting the resultant proteinyl urea in a liquid state with from about .1% to about 1.2% of formaldehyde, based on the weight of the protein solids, at a pH of at least about 5.

12. A method of increasing the viscosity and jelly strength of animal glue which comprises: contacting animal protein liquid with isocyanic acid whereby the free amino groups of the protein are converted to free carbamido groups; and thereafter reacting the resultant proteinyl urea in a liquid state with from about .1% to about 1.2% of an aldehyde sugar selected from the group consisting of glucose and a mixture of glucose and fructose, based on the weight of the protein solids, at a pH of at least about 5.

References Cited in the file of this patent

UNITED STATES PATENTS

| | | |
|---|---|---|
| 1,964,960 | Pierson | July 3, 1934 |
| 2,332,519 | Leonardson et al. | Oct. 26, 1943 |
| 2,381,063 | Kung | Aug. 7, 1945 |
| 2,512,672 | Novotny et al. | June 27, 1950 |
| 2,606,123 | Schmutzler | Aug. 5, 1952 |

FOREIGN PATENTS

| | | |
|---|---|---|
| 512,038 | Great Britain | Aug. 28, 1939 |

UNITED STATES PATENT OFFICE
CERTIFICATE OF CORRECTION

Patent No. 2,923,691                    February 2, 1960

Harland H. Young et al.

It is hereby certified that error appears in the printed specification of the above numbered patent requiring correction and that the said Letters Patent should read as corrected below.

Column 1, line 72, for "Poteins" read -- Proteins --; column 3, line 61, in the table, column 7 thereof, under the sub-heading "Jelly", for "15.5" read -- 15.4 --; column 6, line 25, for "liquid" read -- liquor --.

Signed and sealed this 5th day of July 1960.

(SEAL)
Attest:

KARL H. AXLINE
Attesting Officer

ROBERT C. WATSON
Commissioner of Patents